United States Patent [19]

Büttner

[11] Patent Number: 4,944,658
[45] Date of Patent: Jul. 31, 1990

[54] LUBRICATION PUMP WITH AN ADJUSTABLE METERING DEVICE

[75] Inventor: Willibald Büttner, Kirchenthumbach, Fed. Rep. of Germany

[73] Assignee: Baier & Köppel GmbH & Co., Fed. Rep. of Germany

[21] Appl. No.: 359,357

[22] Filed: May 31, 1989

[30] Foreign Application Priority Data

Jun. 3, 1988 [DE] Fed. Rep. of Germany ....... 3818802

[51] Int. Cl.$^5$ ............................................. F04B 49/08
[52] U.S. Cl. ..................................... 417/274; 417/283
[58] Field of Search ................ 92/60.5; 417/279, 283, 417/274, 490, 284

[56] References Cited

U.S. PATENT DOCUMENTS 3,187,673  6/1965  Kramer et al. .
3,380,387  3/1966  Kofink ................................. 92/60.5

FOREIGN PATENT DOCUMENTS 7609061195-
3dex 11/1953 Fed. Rep. of Germany .
2319249 10/1977 Fed. Rep. of Germany .
444493  6/1937  United Kingdom .
465307  3/1986  United Kingdom .

OTHER PUBLICATIONS

Woerner Zentralschmieranlagen, "Die Mehrleitungspumpe für viele Anwendungsgebiete", (FS 5762) 6 pp.

Primary Examiner—Donald E. Stout
Assistant Examiner—John A. Savio, III
Attorney, Agent, or Firm—Toren, McGeady & Associates

[57] ABSTRACT

A lubrication pump with a stroking action of a delivery piston and with regulatable metering of the amount of lubricant delivered with each stroke of the pump, wherein the delivery piston is actuated by the pump and aspirates the lubricant into a suction space whose volume is adjustable, wherein furthermore the lubricant is fed from the suction space through an intermediate storage space to the lubricant outlet or to the lubrication circulation circuit and wherein a check valve is provided in the above-mentioned delivery path of the lubricant, so that, when viewed in the delivery direction of the lubricant, the check valve is located following the receiving space and upstream of the intermediate storage space.

9 Claims, 2 Drawing Sheets

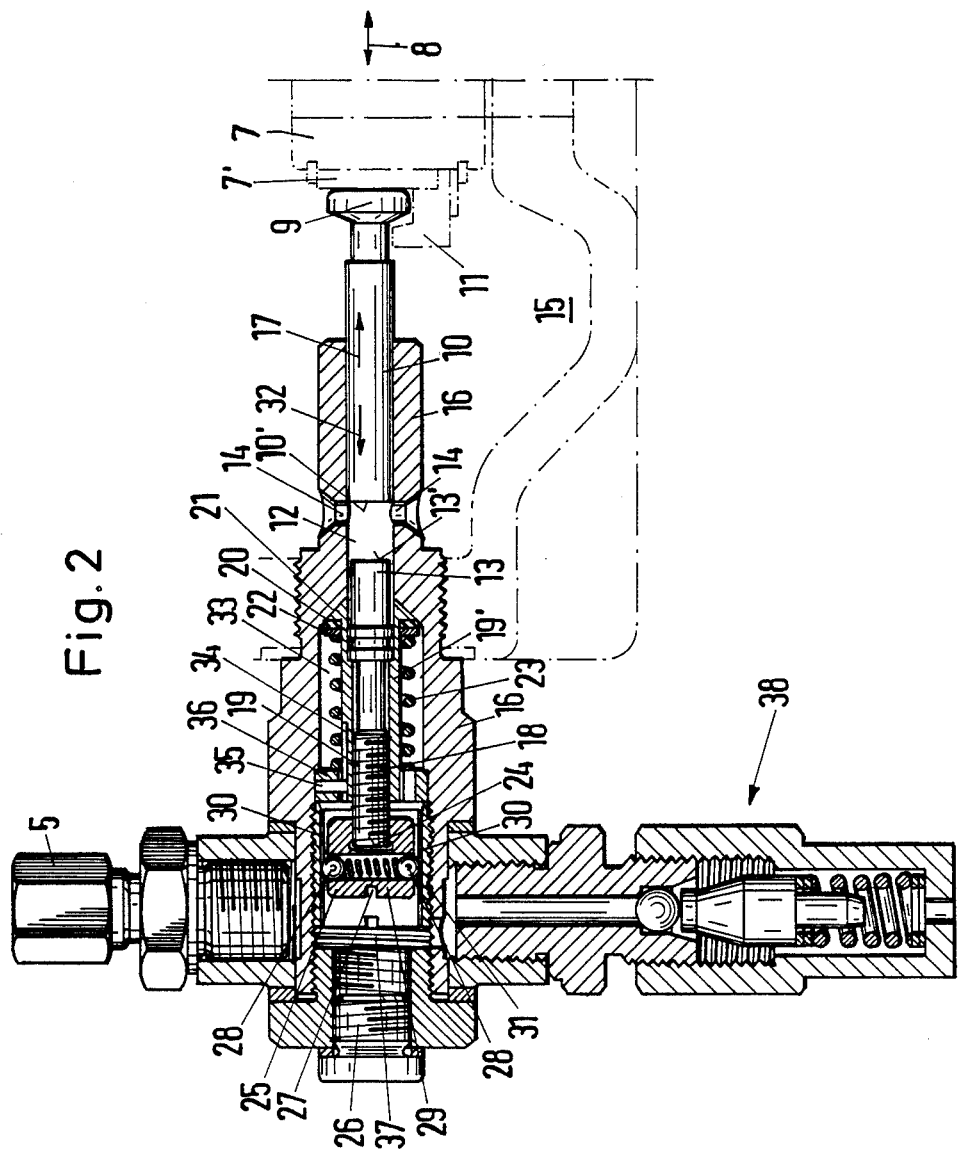

LUBRICATION PUMP WITH AN ADJUSTABLE METERING DEVICE

BACKGROUND OF THE INVENTION:

The invention is directed to a lubrication pump with a stroking action of a delivery piston with regulatable metering of the amount of lubricant delivered with each stroke of the pump, wherein the delivery piston actuated by the pump aspirates or sucks the lubricant into a suction space whose volume is adjustable, wherein furthermore the lubricant is fed from the suction space through an intermediate storage space to the lubricant outlet or to the lubrication circulation circuit and wherein a check valve is provided in the above-mentioned path of the lubricant. More particularly, the present invention relates to lubrication pumps for central lubrication systems of utility vehicles, including trailers, semi-trailers, special vehicles, and the like. The lubricant can be of different types, including lubricants with very high penetration which are difficult to squeeze out. In such a lubrication pump the check valve, viewed in the conveyance direction of the lubricant has previously been provided following upon an intermediate receiving space directly upstream of the outlets to the lubricant's circulation circuit or the lubrication lines of the system which is to be lubricated. Herein it has proved disadvantageous that a mixture of lubricant and air is formed in the intermediate receiving space.

This again entails that during a stroke of the delivery piston the air portion of the mixture present in the intermediate receiving space was compressed so that the quantity of lubricant provided by the adjustment of the arrangement was not fed to the appropriate point to be lubricated, rather only a fraction thereof. The deviation of the lubricant actually fed to the lubrication circulation circuit from the adjusted quantity of lubricant became correspondingly greater, the smaller the quantity of lubricant adjusted by means of the actuation arrangement.

The aim of such a lubrication pump, namely a sufficiently accurate adjustment of the quantity of lubricant to be fed to the lubrication circulation circuit with each stroke of the delivery piston was thus not achieved at all, or at best only incompletely.

SUMMARY OF THE INVENTION

Accordingly, it is an object of the invention, to assure that the lubricant supply adjusted by means of the regulating arrangement is fed accurately, meaning with only small quantity deviations per supply stroke to the lubrication circulation circuit.

Pursuant to this object and others which will become apparent hereafter, one aspect of the present invention resides in the check valve, when viewed in the delivery direction of the lubricant, being located after the receiving space and upstream of the intermediate storage space. The placing of the check valve at the stated point of the lubricant supply travel prevents the penetration of air into the receiving or storing intermediate space, so that it is filled with lubricant in any state of the lubricant supply or the pump motion, without allowing the explained disadvantageous mixture of lubricant with air to be formed. This entails that the quantity of lubricant supplied with each stroke, which had been adjusted with the regulating arrangement, for instance by appropriate increase or reduction of a suction space, is indeed supplied to the lubrication circulation circuit by displacement of the corresponding quantity of lubricant from the intermediate storage space. The arrangement in the invention is sturdy and reliable in its function. Compared to previously known lubrication pumps, no significant additional design or fabrication effort is required.

In a preferred embodiment, regulation of the quantity of lubricant delivered upon each stroke occurs by longitudinal displacement of a regulating piston limiting the suction space in the delivery direction of the lubricant, for instance, by the turning of an adjustment screw cooperating with the regulating piston. This allows placement of both regulating piston and check valve together in a manner favoring construction and fabrication.

In another embodiment the check valve and regulating piston are functionally connected with each other.

In still another advantageous embodiment of the invention the end faces of the delivery piston and of the regulating piston, which face each other and which limit the suction space respectively with their end faces, are positioned in such a way, that the delivery piston comes to rest at the regulating piston in the final phase of its advance motion and that it displaces the regulating piston while carrying the check valve with it in the delivery direction of the lubricant against the action of a spring. This assists the opening motion of the check valve, which has already occurred because of the delivery of the lubricant. The check valve is maintained open in the travel path of the lubricant in the region of the check valve until the lubricant delivery piston is again moved back.

Other advantages and features of the invention will be discernable from the following detailed description of the invention taken together with the drawings.

BRIEF DESCRIPTION OF THE DRAWINGS

FIG. 2 illustrates an embodiment of an arrangement in the invention at an increased scale sectioned along the line II—II in FIG. 1.

DETAILED DESCRIPTION OF THE PREFERRED EMBODIMENTS

Figure 1:
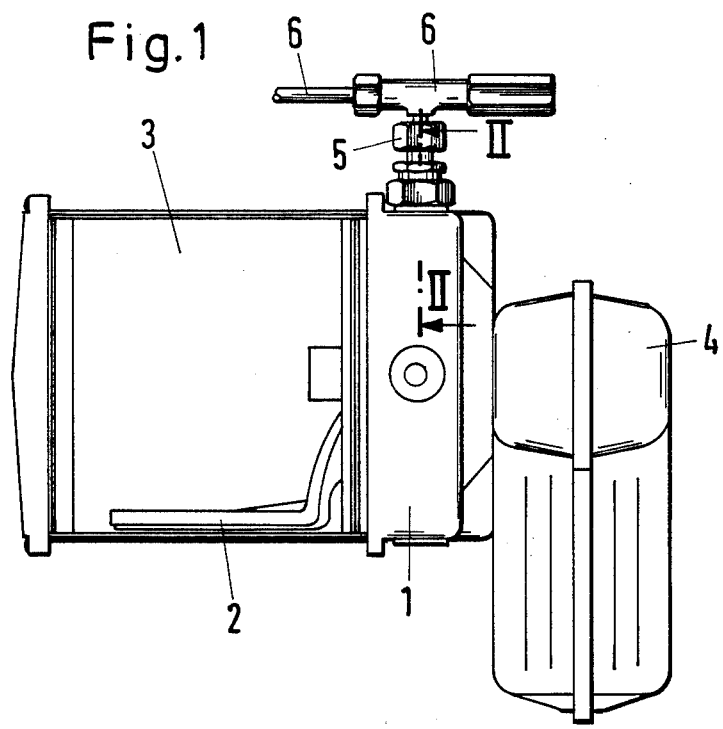
FIG. 1 is a diagrammatic illustration of a lubrication pump with drive pursuant to the invention.

FIG. 1 shows a lubrication pump 1, with a stirrer 2 and lubricant storage space 3, driven by an electric motor 4. The lubricant delivered by the pump arrives in a line 6 of the lubricant circulation circuit through an outlet 5.

The section in FIG. 2 shows, to begin with, an eccentric arrangement 7 of the pump 1 at a scale magnified in comparison with FIG. 1, which is movable back and forth in the direction of the arrow 8 with the revolution of the pump shaft and correspondingly moves a tappet 9 of a delivery piston 10 backward and forward. The forward movement occurs by means of an end face 7' of the eccentric arrangement and a backward movement by means of a follower 11, which engages the tappet 9 from the rear. The delivery piston 10 bounds a suction space 12 with its end face 10' lying in the delivery direction. The opposite end face of the delivery piston 10 is bounded by the front side 13' of a regulating member 13 which will be explained later on. Lubricant can be aspirated into the suction space 12 through a lateral bore 14 from the space 15 surrounding the housing 16 in this arrangement. This occurs by a corresponding rearward stroke of the delivery piston 10 according to arrow 17.

The regulating member 13 engages with a thread 18 into a matching counter thread 19 of a hollow cylindrical lug 19′, which forms the check valve with its end 20 located on the right side in FIG. 2, especially with its oblique end face 21. Thus, the lug rests at a corresponding opposite face 22 of the housing 16 under the pressure of a helical spring 23. The regulating member 13 is rigidly, meaning so as to be rotationally entrained, fixed with its end 24, located on the left in FIG. 2, in an adjustment screw 25, which is rotatable by inserting a screwdriver through an aperture 26 into a slot 27. By rotating this adjustment screw 25 the regulating member is displaceable relative to the check valve to the right or left (refer to FIG. 2) in the direction of the twin arrow 8 because of its threaded engagement 18, 19. By means of this the distance between the two end faces 10′ and 13′ of the delivery piston 10 and the regulating member 13 and thus the volume of the suction space 12 is adjustable to a desired lubricant delivery quantity per stroke of the eccentric arrangement 7.

The adjustment screw 25 engages with two snap-in balls 28, which are pressed outward by a spring 29, into longitudinal grooves 30 of a guide sleeve 31, which is fixed in the housing 16. Thus, for example, four of these longitudinal grooves 30 offset respectively by 90° or also two of these longitudinal grooves offset respectively by 180° can be provided at the inside surface of the guide sleeve 31. By this arrangement, a measurement of the change of the volume of the suction space 12 is given to a person performing the adjustment process by the snap-in of the balls 28 into the longitudinal grooves. Apart from that, the longitudinal guidance of the part 31 provided by the grooves 30 in the direction of the twin arrow 8 permits a corresponding displacement of the regulating member 13 because of the stroking motion of the delivery piston 10.

The movement of the delivery piston 10 in delivery direction 32 presses the regulating member 13 to the left because of the lubricant present in the suction space 12. At the same time, the check valve 20 is also moved to the left because of the threaded connection 18, 19 (the direction indications refer to those illustrated in FIG. 2), whereby a gap for passage of the lubricant from the suction space 12 through the check valve 20 into an intermediate receiving space 33 is formed between the face 21 of the check valve 20 and the opposite face 22 of the housing 16. In order to make possible this longitudinal displacement of the check valve 20, it can be shifted to and from in the direction of the twin arrow 8 by means of a longitudinal guide surface 34, into which a pin 35 of a support 36 in the housing engages.

The previously mentioned intermediate receiving space 33 surrounds somewhat cylindrically the portion of the regulating member 13 which is located between the check valve 20 and the regulating screw 25. As soon as the intermediate receiving space 33 is completely filled with lubricant, this lubricant is pressed during a delivery stroke of the delivery piston 10 through an annularly cylindrical gap between the regulating screw 25 and the guide sleeve 31 into a space 37, and from this space upwards in the direction of the outlet 5 (refer to the presentation in FIG. 2). The usual relief valve is designated generally with 38. As has already been stated, the intermediate receiving space 33 is entirely filled with lubricant during operation of the pump. Herein air inclusions in the intermediate storage space 33 are avoided because of the tight sealing between the space 33 and the suction space 12 provided by the check valve 20, 21. The opening of the check valve, which occurs because of the lubricant pressure during the delivery stroke, can, during the further course of the delivery motion 32 of the delivery piston 10, be additionally assisted by the circumstance that its end face 10′ comes to rest at the end face 13′ of the regulating member 13 and moves the regulating piston 13 a certain amount towards the left. The magnitude of this amount of movement depends on how far the regulating piston 13 was moved toward the right by the regulating screw 25 in FIG. 2. Herein the open position of the check valve is maintained by the delivery piston 10 until the delivery piston 10 is returned by the eccentric arrangement towards the right in the opposite direction (suction direction) 17. Upon the following stroke of the eccentric arrangement, and thus the movement of the delivery piston 10 towards the left again, the same amount of lubricant metered by the adjustment of the size of the space 12 is sent to the lubricant circulation circuit and so on.

While the invention has been illustrated and described as embodied in a lubrication pump with an adjustable metering device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A lubrication pump with regulatable metering of an amount of lubricant delivered with each stroke of the pump, comprising:
    a suction space having an adjustable volume;
    a delivery piston actuatable in a stroking manner by the pump so as to aspirate the lubricant into the suction space;
    means for feeding the lubricant from the suction space through an intermediate storage space to one of a lubricant outlet and a lubrication circulation circuit;
    a longitudinally displaceable regulating member provided so as to limit the suction space in a delivery direction of the lubricant, regulation of a quantity of lubricant delivered upon each stroke occurring by longitudinal displacement of the regulating member;
    a housing provided so as to surround the regulating member, the housing having lateral bores for passing the lubricant from the intermediate storage space to the suction space; and
    a check valve provided in the delivery path of the lubricant, the check valve, when viewed in the delivery direction of the lubricant, being located following the suction space and upstream of the intermediate storage space, the check valve having an annularly shaped sealing surface arranged so as to surround the regulating member and rest at a sealing surface of the housing in a closed position.

2. A lubrication pump according to claim 1, wherein the regulating piston has a thread and the check valve has a matching thread, the thread of the regulating piston being engageable with the matching thread of the check valve, and further comprising an adjustment screw, accessible and rotatable from outside, connected with the regulating piston so that both items rotate together.

3. A lubrication pump according to claim 2, and further comprising a pressure spring provided so as to abut on one end at the housing and on another side at the check valve so that the spring urges the check valve into its closed position, the regulating piston together with the associated adjustment screw and the check valve being displaceable relative to the associated housing in its longitudinal direction.

4. A lubrication pump according to claim 3, wherein the delivery piston and the regulating piston have end faces which face each other so as to limit the suction space, the delivery piston and the regulating piston being positioned so that the delivery piston comes to rest at the regulating piston in a final phase of its advance motion and so that it displaces the regulating piston while carrying the check valve with it in the delivery direction of the lubricant against the action of the spring.

5. A lubrication pump according to claim 4, wherein the delivery piston comes to rest against the regulating member in the final phase of its advance motion.

6. A lubrication pump according to claim 2, wherein the intermediate storage space is formed approximately annularly cylindrical so as to surround a portion of the regulating piston which is located between the check valve and the adjustment screw.

7. A lubrication pump according to claim 2, wherein the adjustment screw includes two snap-in balls which are pressed outwardly by a spring into longitudinal grooves of a guide sleeve fixed in the housing so that a stepped adjustment of the regulating member is obtained by rotation of the adjustment screw, which rotation causes the balls to compress the spring, disengage from one groove and snap into another groove.

8. A lubrication pump according to claim 1, wherein the sealing surface of the check valve and the sealing surface of the housing extend in a conical manner.

9. A lubrication pump according to claim 3, wherein the delivery piston comes to rest near the regulating member in a final phase of its advance motion so that a certain amount of lubricant remains between the end faces of the delivery piston and the regulating member.

* * * * *

UNITED STATES PATENT AND TRADEMARK OFFICE
CERTIFICATE OF CORRECTION

PATENT NO. : 4,944,658                                      Page 1 of 2

DATED : July 31, 1990

INVENTOR(S) : Willibald Buttner

It is certified that error appears in the above-identified patent and that said Letters Patent is hereby corrected as shown below:

Column 2, line 68, before "space", insert -- storage --.

Column 3, line 68, change "storage" to -- receiving --.

IN THE CLAIMS:

Claim 1.

Column 4, line 48, change "storage" to -- receiving --.

Column 4, line 59, before "storage", change "the intermediate" to -- a --.

UNITED STATES PATENT AND TRADEMARK OFFICE
CERTIFICATE OF CORRECTION

PATENT NO. : 4,944,658

DATED : July 31, 1992

INVENTOR(S) : Willibald Buttner

It is certified that error appears in the above-identified patent and that said Letters Patent is hereby corrected as shown below:

Column 4, line 65, change "storage" to -- receiving --.

Claim 6.

Column 6, line 2, change "storage" to -- receiving --.

Signed and Sealed this

Fifth Day of October, 1993

Attest:

BRUCE LEHMAN

Attesting Officer

Commissioner of Patents and Trademarks